No. 735,388. PATENTED AUG. 4, 1903.
D. B. JAMES.
SWINGING SCRAPER AND SCOOP MACHINE.
APPLICATION FILED NOV. 14, 1902.
NO MODEL.
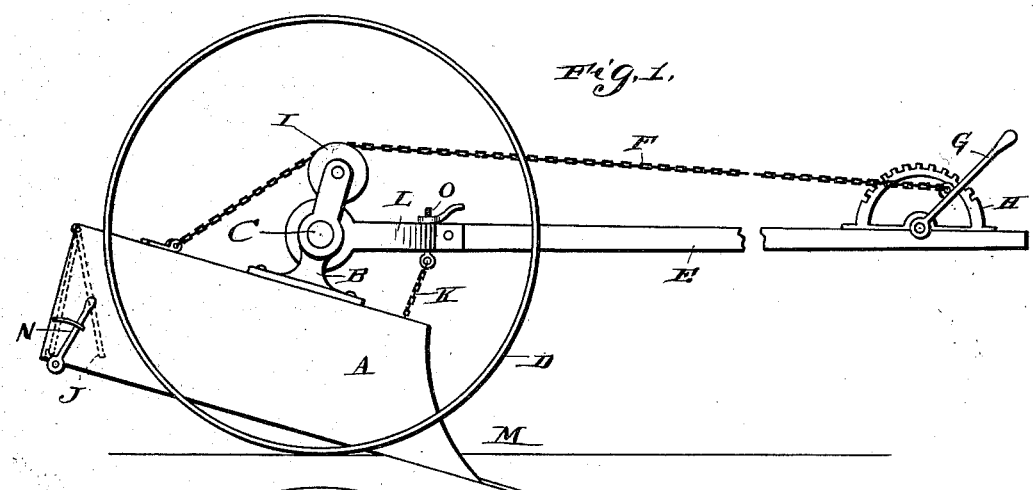
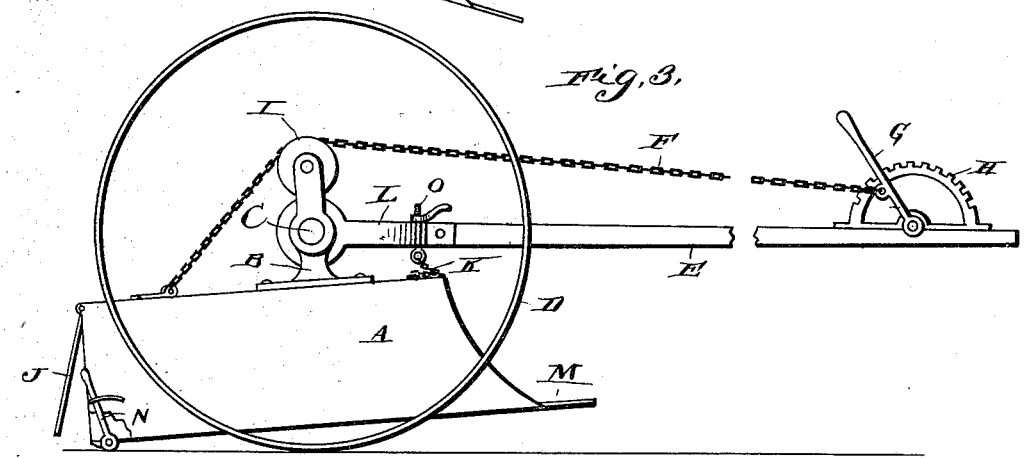
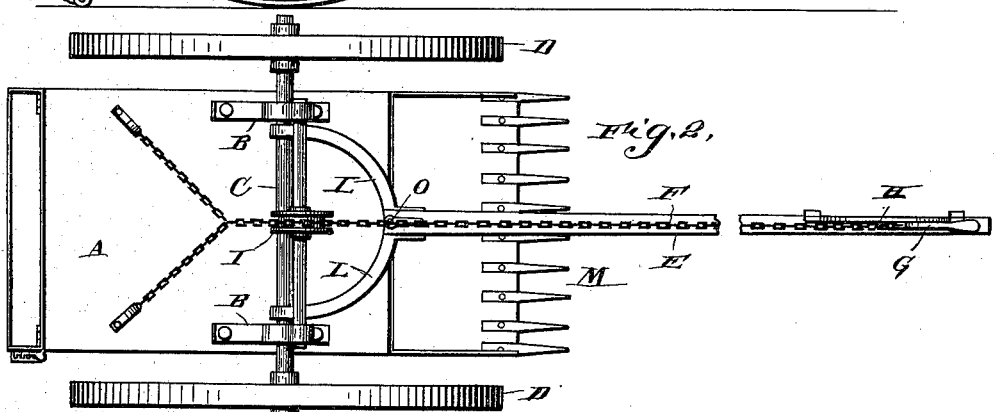
Witnesses:
W. J. Stewart
Charles R. Stewart
Inventor:
David Rice James No. 735,388. Patented August 4, 1903.

UNITED STATES PATENT OFFICE.

DAVID BICE JAMES, OF SAN FRANCISCO, CALIFORNIA.

SWINGING SCRAPER AND SCOOP MACHINE.

SPECIFICATION forming part of Letters Patent No. 735,388, dated August 4, 1903.

Application filed November 14, 1902. Serial No. 131,449. (No model.)

*To all whom it may concern:*

Be it known that I, DAVID BICE JAMES, a citizen of the United States, residing at San Francisco, in the county of San Francisco and State of California, have invented a new and useful Swinging Scraper and Scoop Machine, of which the following is a specification.

My invention relates to improvements in scrapers; and the objects of my improvement are, first, to provide an oblong box or scoop of sheet-iron of suitable thickness and dimensions for the purpose desired with one end open and the lower end carrying teeth to receive sand, mud, or gravel and the opposite end of scoop closed with swinging gate hung from top of scoop to retain the material that is drawn into the scoop and also admit the scoop to be unloaded or emptied, the scoop to be suspended below and from an axletree supported by two wheels, the scoop being connected to the round axletree by iron straps and thimbles to allow the scoop to turn freely as the scoop is drawn in sand or other material to fill itself. I attain these objects by the mechanism illustrated in the accompanying drawings, in which—

Figure 1 is a vertical side view of the swinging scoop taking material. Fig. 2 is a top view of the swinging scoop carried upon a round axletree inserted into wheels. Fig. 3 is a side view of the swinging scoop in position to be emptied.

Similar letters refer to similar parts throughout the several views.

The box or scoop scraper A in Fig. 1 is connected by straps B to axletree C, connecting carrying-wheels D, upon which scoop A is carried and hung, tongue E, of any desired length, connected with axletree C by hounds L, enabling the scoop to be pushed backward or drawn forward to fill, chain F, connected to lever G on the quadrant H, running over pulley I upon axletree C to rear end of scoop A to control and adjust it, allowing gate end of scoop to lower when filled.

The scoop A is connected with axletree C nearer its front end, so that when it is partially filled and chain F is released by the lever G in the quadrant H the scoop from excess of weight toward the rear end tips backward and offers no resistance to be drawn out of the water to be emptied of its contents, which is done by releasing the lever N, that fastens the gate J. The chain K, the tongue E, with threaded bolt O, with scoop A, controls pitch of same and regulates the amount of material to be taken up and prevents the scoop from going too deep.

Figs. 2 and 3 are simply to show more clearly the construction and operation of the swinging scoop-scraper.

I am aware that prior to my invention scrapers have been used for moving sand and earth. I therefore do not claim such a combination broadly; but What I do claim as my invention, and desire to secure by Letters Patent, is—

1. In a scoop-scraper having supporting-wheels and axle the combination of a scoop suspended from the axle; a long tongue connected with the axle; a quadrant lever connected with the forward end of the tongue and a flexible connection between the lever and the rear end of the scoop substantially as described.

2. In a scoop-scraper having supporting-wheels and axle the combination of a scoop pivotally connected with the axle, a long tongue attached to the scraper an adjustable connection between the tongue and the forward end of the scoop a quadrant lever attached to the forward end of the tongue and a connection between the lever and the rear end of the scoop.

DAVID BICE JAMES.

Witnesses:
W. J. STEWART,
CHARLES RICKOFF.